(12) United States Patent
Többen et al.

(10) Patent No.: US 9,464,558 B2
(45) Date of Patent: Oct. 11, 2016

(54) HEATING DEVICE FOR AN EXHAUST SYSTEM

(71) Applicant: Eberspächer Exhaust Technology GmbH & Co. KG, Neunkirchen (DE)

(72) Inventors: Heike Többen, Uhingen (DE); Georg Wirth, Kirchheim/Teck (DE)

(73) Assignee: Eberspächer Exhaust Technology GmbH & Co. KG, Neunkirchen (DE)

(*) Notice: Subject to any disclaimer, the term of this patent is extended or adjusted under 35 U.S.C. 154(b) by 0 days.

(21) Appl. No.: 14/661,186

(22) Filed: Mar. 18, 2015

(65) Prior Publication Data

US 2015/0267596 A1    Sep. 24, 2015

(30) Foreign Application Priority Data

Mar. 19, 2014  (DE) .................. 10 2014 205 156

(51) Int. Cl.

| F01N 13/14 | (2010.01) |
|---|---|
| F01N 13/08 | (2010.01) |
| F01N 3/20 | (2006.01) |
| F01N 13/04 | (2010.01) |
| F01N 3/025 | (2006.01) |

(52) U.S. Cl.
CPC ............ *F01N 13/08* (2013.01); *F01N 3/0253* (2013.01); *F01N 3/2066* (2013.01); *F01N 13/04* (2013.01); *F01N 13/14* (2013.01); *F01N 2240/16* (2013.01); *F01N 2610/02* (2013.01); *F01N 2610/03* (2013.01); *F01N 2610/1453* (2013.01)

(58) Field of Classification Search
CPC .... F01N 3/0253; F01N 3/2066; F01N 13/04; F01N 13/08; F01N 13/14; F01N 2240/16; F01N 2560/20; F01N 2610/02; F01N 2610/03; F01N 2610/1453
See application file for complete search history.

(56) References Cited

U.S. PATENT DOCUMENTS

| 3,886,739 A | 6/1975 | Lee |
|---|---|---|
| 4,981,368 A | 1/1991 | Smith |

(Continued)

FOREIGN PATENT DOCUMENTS

| DE | 27 07 244 A1 | 9/1978 |
|---|---|---|
| DE | 196 46 025 A1 | 5/1998 |

(Continued)

OTHER PUBLICATIONS

Japanese Office Action of Jan. 6, 2016.

*Primary Examiner* — Audrey K Bradley
(74) *Attorney, Agent, or Firm* — McGlew and Tuttle, P.C.

(57) ABSTRACT

An exhaust system (1) for an internal combustion engine has an exhaust line (2), which has at least one exhaust pipe (3) having a pipe wall (4) with an inner side (5) defining an exhaust gas path (6) guiding an exhaust gas flow (7) and an electric heating device (18) for heating at least one length section of the exhaust pipe (3). An efficient design is obtained if a heating coil (21) is wound several times around the exhaust pipe (3) on an outer side (22) of the pipe wall (4) in the respective length section and has an electric conductor (23) made of a resistance heating material. An electric insulator (24) is arranged between the conductor (23) and the outer side (22) of the pipe wall (4). A heat-insulating cover (25) envelops the exhaust pipe (3) at least in the area of the respective heating coil (21).

19 Claims, 3 Drawing Sheets

(56) References Cited

U.S. PATENT DOCUMENTS

| | | | | |
|---|---|---|---|---|
| 5,972,299 A | * | 10/1999 | Huang | F01N 1/089 422/173 |
| 2010/0290957 A1 | | 11/2010 | Yoshida et al. | |
| 2014/0041367 A1 | * | 2/2014 | Balthes | F01N 3/035 60/274 |

FOREIGN PATENT DOCUMENTS

| | | | | |
|---|---|---|---|---|
| DE | 19753206 C1 | * | 2/1999 | B01J 19/24 |
| DE | 10 2008 001 212 A1 | | 10/2009 | |
| DE | 10 2010 034 707 A1 | | 2/2012 | |
| EP | 0 894 523 A1 | | 2/1999 | |
| EP | 1 564 386 A1 | | 8/2005 | |
| EP | 2 161 421 A1 | | 3/2010 | |
| FR | 2959275 A1 | * | 10/2011 | F01N 3/035 |
| JP | H4-31616 A | | 2/1992 | |
| JP | 2003-201838 A | | 7/2006 | |
| JP | 2008-75527 A | | 4/2008 | |
| JP | 2010-265862 A | | 11/2011 | |
| JP | 2013002334 A | * | 1/2013 | F01N 3/08 |
| JP | 2013-133805 A | | 7/2013 | |

\* cited by examiner

HEATING DEVICE FOR AN EXHAUST SYSTEM

CROSS REFERENCE TO RELATED APPLICATIONS

This application claims the benefit of priority under 35 U.S.C. §119 of German Patent Application DE 10 2014 205 156.8 filed Mar. 19, 2014, the entire contents of which are incorporated herein by reference.

FIELD OF THE INVENTION

The present invention pertains to an exhaust system for an internal combustion engine, which may be arranged especially in a motor vehicle. The present invention pertains, in addition, to a method for operating such an exhaust system.

BACKGROUND OF THE INVENTION

An exhaust system comprises, in the usual manner, an exhaust line, which has at least one exhaust pipe, whose pipe wall defines with an inner side an exhaust gas path for guiding an exhaust gas flow. The exhaust line begins at the engine block of the internal combustion engine, as a rule, with an exhaust manifold or exhaust collector and ends towards the surrounding area with at least one tail pipe. A plurality of exhaust gas treatment devices, for example, catalytic converters and particle filters, are integrated into the exhaust line. Further, the exhaust line usually contains at least one muffler. To connect the individual components with one another, the exhaust line contains aforementioned exhaust pipes. Sensors for measuring parameters of the exhaust gas flow and/or of the exhaust system as well as injectors for introducing a reactant, especially a reducing agent or an oxidizing agent, or the like into the exhaust gas flow may be arranged in the area of these exhaust pipes on the exhaust line.

Different temperatures prevail within the exhaust system from the exhaust manifold to the tail pipe during the operation of the exhaust system. There is a risk of condensation and the formation of deposits in the interior of the exhaust line in colder areas. For example, a film of combustion residues, for example, soot, water or hydrocarbons, may become deposited on the inner side of the pipe wall. If an aqueous urea solution is introduced as a reducing agent into the exhaust gas flow, for example, in connection with an SCR system, in which SCR denotes Selective Catalytic Reduction, there is, in addition, a risk that urea crystals will form. These contaminants within the exhaust line may compromise, for example, the guiding of the exhaust gas flow. Further, these contaminants may represent an increased risk of corrosion for the affected pipe wall. The risk of such condensation and deposit formation is especially great particularly in case of a cold start as well as when driving over short distances, because the pipe walls affected are still at a comparatively low temperature level, on the one hand, and since relatively high temperatures are needed to remove the deposits, on the other hand.

To counteract these problems, it is possible, in principle, to heat the exhaust gas flow more intensely, as a result of which the exhaust line as a whole can be brought to an elevated temperature level more rapidly. Electrically heatable catalytic converters, which are usually called EKAT, may be used here. However, such an EKAT requires a comparatively large amount of energy to be able to heat the relatively large exhaust gas mass flow correspondingly. An additional problem arises here concerning the electrical insulation of the high electric currents against the metallic components of the exhaust line when corresponding electric lines must be passed through a usually metallic pipe wall.

SUMMARY OF THE INVENTION

An object of the present invention is to provide an improved embodiment for an exhaust system of the above-described type or for a corresponding operating method, which embodiment is characterized especially in that the risk of an undesired condensation and/or deposit formation is reduced, and, in addition, the amount of energy needed for this is reduced.

The present invention is based on the general idea of heating at least one area of the exhaust pipe, which is exposed to the risk of condensation or the risk of precipitation, by means of an external electrical heating device, i.e., a heating device arranged on an outer side of the respective pipe wall. While a conventional heating of the exhaust gas flow by means of an EKAT heats the entire exhaust system globally downstream of the EKAT, the exhaust system is heated only locally according to this suggestion, namely, in the area actually affected by the risk of condensation or the risk of precipitation. As a result, significantly less electric energy is needed to reduce the risk of undesired condensation and deposit formation. Furthermore, provisions are made for the heating device to be arranged on the outer side of the pipe wall whose inner side defines the gas path for guiding the exhaust gas flow. By heating the outer side, the inner side of the pipe wall is also heated almost without losses through the usually metallic pipe wall in order to hinder the condensation and deposit formation there. Further, it is advantageous that despite the electric heating device, no electric lines must be passed through the pipe wall, so that the electrical insulation can be managed in a comparatively simple manner even in case of high currents.

It is, in addition, proposed for the exhaust system according to the present invention that the heating device be equipped with at least one heating coil, which winds several times around a length section of the exhaust pipe, which said section is to be heated, on the outer side of the pipe wall. The respective heating coil has an electrical conductor made of a resistance heating material. Such a resistance heating material is characterized in that it is electrically conductive and is heated up when conducting electric currents. It is usually a special metal alloy. Further, an electric insulator is arranged between the conductor and the outer side of the pipe wall, as a result of which the pipe wall and the exhaust pipe are electrically uncoupled from the electric currents for operating the heating device. Furthermore, it is proposed that the heating device be equipped with a heat-insulating cover, which envelops the exhaust pipe with the corresponding heating coil. It is achieved, due to the heat-insulating cover on the outer side of the heating coil, that the heat generated by the heating coil is dissipated towards the inside, i.e., to the pipe wall of the corresponding length section of the exhaust pipe. The efficiency of the heating device can thus be improved considerably by means of the cover. Furthermore, the cover may at the same time bring about an encapsulation for the heating device. Further, the cover may form a protection against contaminants for the heating device. The cover may also act as a stone chip protection device for the heating device.

Corresponding to an advantageous embodiment, the cover may have a shell mounted on the exhaust pipe and an electrically insulating filling, which fills an annular space between the shell and the exhaust pipe, in which the respective heating coil is arranged. The shell may be fastened to the exhaust pipe in a suitable manner. The shell is advantageously a metal component, for example, a shaped sheet metal part, which is welded to the exhaust pipe. The annular space is protected from solid and liquid contaminants hereby. Furthermore, the shell thus forms a stone chip protection device.

The insulator may be formed in another embodiment by an insulating layer applied to the outer side of the pipe wall, in which case the conductor of the heating coil is wound on this insulating layer and is in contact with this. A suitable insulating layer may be designed, for example, as a mica layer. The conductor of the heating may be strip-shaped, i.e., with a rectangular cross section, or wire-like, i.e., with a round cross section. As an alternative, the respective heating coil may have a core forming the conductor and a jacket forming at least a part of the insulator and enveloping the jacket. The conductor and the insulator are wound around the pipe section to be heated in this case. The heating coil may have, moreover, an electrically insulating powder filling between the jacket and the core, such that the core does not touch the jacket. The core preferably has a round, especially circular cross section here.

In another embodiment, at least one such heating device may be arranged in the area of an exhaust gas probe, which is mounted on the exhaust pipe. Such an exhaust gas probe may be, for example, a lambda probe or an NOX probe. Such probes may be exposed to condensate especially in case of a cold start, as a result of which the probes may cool comparatively intensely, a phenomenon called quenching. Proper detection of measured values by the probes is greatly compromised hereby. By heating the exhaust pipe in the area of the exhaust gas probe, the risk of an undesired cooling of the respective probe due to precipitation or condensate can be reduced, as a result of which the proper function of the respective probe is improved.

At least one such heating device may be arranged in another embodiment in the area of a reactant feed device, which encloses the exhaust pipe. The exhaust pipe is part of the reactant feed device in this case. Such a reactant feed device usually comprises an injector, which is mounted on the exhaust pipe and by means of which the respective reactant can be introduced into the exhaust pipe and into the exhaust gas being guided therein. For example, a fuel, which shall be reacted in the oxidation catalytic converter in order to heat the exhaust gas flow, may be introduced as an oxidizing agent into the exhaust gas flow upstream of an oxidation catalytic converter. Such an intensive heating of the exhaust gas flow may be necessary, for example, to regenerate a particle filter. As an alternative, it may likewise be possible by means of such an injector to introduce a suitable reducing agent, for example, an aqueous urea solution, into the exhaust gas flow. Water and urea react by thermolysis and hydrolysis to form ammonia and carbon dioxide, which will in turn convert nitrogen oxides into nitrogen and water in the SCR catalytic converter. The respective reactant, i.e., especially the above-mentioned oxidizing agent or reducing agent, is introduced, as a rule in the liquid form. This is associated with the risk of precipitation of the liquid reactant, for example, on the exhaust pipe or on a static mixer of the reactant feed device, which mixer may be arranged between the aforementioned injector and the aforementioned SCR catalytic converter or oxidation catalytic converter. Evaporation of this precipitate can now be supported by means of the heating device in order to prevent permanent deposits, which may develop, for example, due to crystallization processes, from forming.

According to an advantageous variant, the respective heating device may be arranged in the area of said injector. The risk of permanent deposit formation is avoided in this manner precisely in the area of the injector.

In addition or as an alternative, the respective heating device may be arranged in the area of a wall section of the exhaust pipe, which is located opposite the injector in a spraying direction. At low flow velocities, the reactant can impact as a precipitate on the inner side of the pipe wall exactly in this wall section. The evaporation of the precipitate is improved and the risk of crystallization is reduced by a specific heating of this wall section.

In addition or as an alternative, the respective heating device may be arranged in the area of a mixer, which is arranged downstream of the injection in the exhaust gas flow. The mixer, which may also be called a static mixer, improves the mixing of the reactant introduced with the exhaust gas flow during the flow through it. At the same time, the mixer is also used as an impact surface for liquid reactant in order to evaporate the reactant. The mixer thus also acts as an evaporator. By heating the exhaust pipe in the area of the mixer, heat can be supplied to the mixer in a specific manner, as a result of which the evaporating action of the mixer is improved. The risk of crystallization of the reactant can thus also be reduced at the mixer.

Corresponding to an advantageous variant, the mixer may have a cylindrical pipe body, from which a plurality of guide blades project inwardly and which is in contact with the inner side of the pipe wall. Due to the physical contact between the pipe body and the pipe wall, there is improved heat transfer between the pipe wall and the pipe body, so that the heat introduced into the pipe wall by means of the heating device can be passed on efficiently to the pipe body and via this to the guide blades. The mixer may be manufactured integrally in one piece with the pipe body and the guide blades. For example, the mixer may be a one-part shaped sheet metal part. The mixer may likewise be a one-part cast part or sintered part. As an alternative, a built-up mixer is also conceivable.

According to an advantageous variant, the pipe wall may have, in the area of the mixer, an axial interruption, which is bridged over by the pipe body. The axial interruption forms a ring-shaped slot, which generates an axial distance between the pipe sections adjoining the interruption. The pipe body may be axially larger than this axial interruption and may, in addition, be positioned such that it bridges over the interruption. The outer side of the pipe wall is thus formed in the area of the interruption by an outer side of the pipe body, while the inner side of the pipe wall in the area of the interruption is formed by an inner side of the pipe body. There is an axial overlap between the pipe body and the exhaust pipe axially on both sides of the interruption. The heat generated by the heating device can be transmitted better, especially directly, to the pipe body due to the interruption of the exhaust pipe in the area of the mixer, so that the losses due to conduction through the pipe wall in the area of the mixer can be reduced or avoided.

Especially advantageous is a variant in which the respective heating coil is directly in contact with the pipe body in the area of the interruption. The mixer can be heated especially efficiently as a result.

Provisions may be made according to another advantageous embodiment for the heating coil to have a higher winding density in the area of the pipe body than outside the pipe body. The heating coil can dissipate more heat in the area of the pipe body due to the increased winding density, as a result of which the specific heating of the mixer is improved. This measure is independent from whether the exhaust pipe has an interruption bridged over by the pipe body or has an axially continuous design in the area of the mixer.

The pipe body of the mixer may also be inserted into the interruption axially flush with the sections of the exhaust pipe that adjoin the interruption, so that the pipe body of the mixer itself forms an axial section of the exhaust pipe in the interruption. The pipe body is advantageously welded, for example, by means of circumferential weld seams, to the sections of the exhaust pipe that adjoin the interruption.

In another embodiment, the heating device may have a control by means of a time diagram or a characteristic diagram. Such a control can be embodied in an especially simple manner. As an alternative, the heating device may have at least one PTC element, which is connected in series with the conductor or which is formed by the conductor. PTC denotes Positive Temperature Coefficient and means that the respective PTC element consists of a special resistance heating material, which is heated while current is flowing through it and shows, moreover, a higher electric resistance with rising temperature. Further, such a PTC element can be designed for a certain temperature, beginning from which no further current flow is possible any longer, so that the temperature will then also be unable to continue to rise. This leads to an especially simple self-regulation for a predetermined temperature. As an alternative, the heating device may have a regulation by means of at least one temperature sensor. Relevant temperatures for the regulation may be, for example, the temperature of the pipe wall and/or the current exhaust gas temperature and the current reactant temperature.

In another advantageous embodiment, the heating device may have a control device, which is designed and/or programmed such that it can actuate the heating device to carry out an operating method explained in more detail below.

The method according to the present invention for operating the exhaust system or the respective heating device is characterized in that the energization of the respective heating coil is controlled and/or regulated such that at least one area in the exhaust pipe, which is exposed to the risk of condensation of a liquid evaporated in the exhaust gas flow or to the risk of precipitation of a liquid introduced into the exhaust gas flow, is heated to above the evaporation temperature of the respective liquid. It is achieved due to this measure that the area of the exhaust pipe exposed to condensation or precipitation can again be freed from condensation or precipitation due to evaporation, as a result of which, for example, the risk of crystallization of the condensate or precipitate is reduced. The respective area of the exhaust pipe may be, according to the above-described embodiments of the exhaust system, a wall section of the exhaust pipe or a sensor arranged at the exhaust pipe or a mixer or blades of a mixer, which are arranged in the exhaust pipe.

According to an advantageous embodiment of the method and of the control device, a current temperature and/or a current reactant temperature and/or a current quantity of injected reactant can be taken into account during the energization of the respective heating coil. The control device of the heating device communicates, for example, with a control device of the reactant feed device and knows as a result, for example, the current injected quantity. Due to a corresponding temperature sensor system, the control knows, moreover, the current exhaust gas temperature and the current reactant temperature. Further, the control device can know the current temperature of the exhaust pipe and of the pipe wall. The risk of condensation and the risk of reactant precipitation can be determined from the different parameters and the heat necessary for the evaporation of the precipitate or condensate can be calculated. As a result, the heating device operates especially efficiently.

It is apparent that the above-mentioned features, which will also be explained below, may be used not only in the particular combination indicated, but in other combinations or alone as well, without going beyond the scope of the present invention.

Preferred exemplary embodiments of the present invention are shown in the drawings and will be explained in more detail in the following description, in which identical reference numbers designate identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
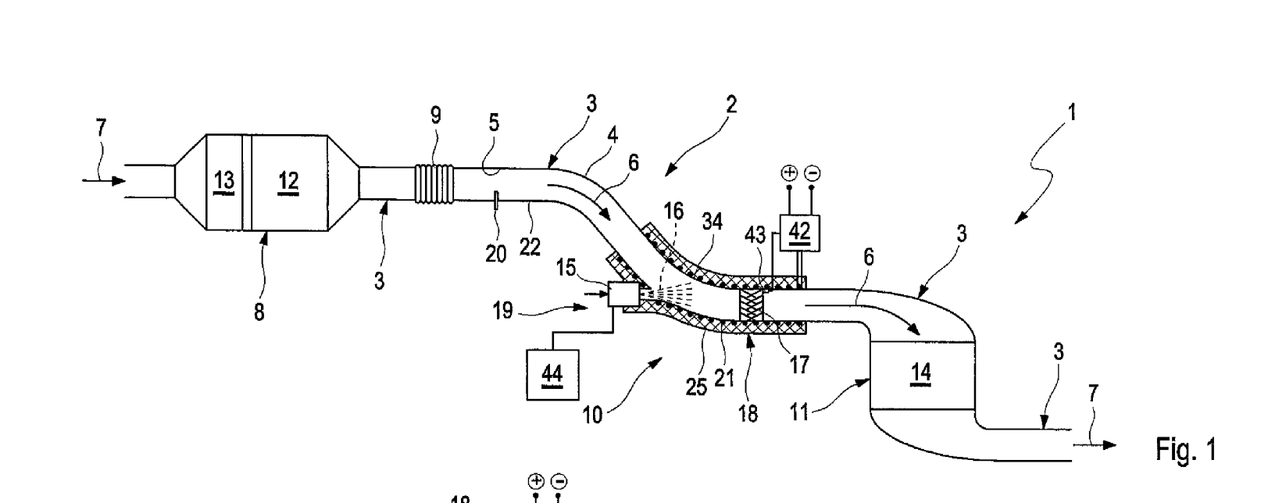
FIG. 1 is a highly simplified, circuit diagram-like schematic diagram of an exhaust system with a heating device in one of various embodiments.
Figure 2:
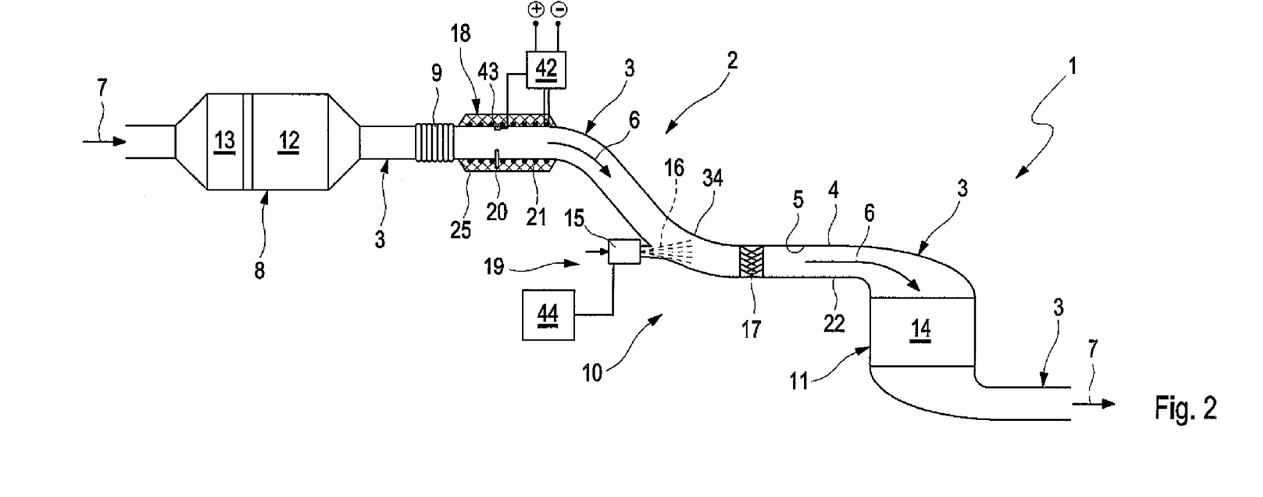
FIG. 2 is a highly simplified, circuit diagram-like schematic diagram of an exhaust system with a heating device in one of various embodiments.

Referring to the drawings, corresponding to FIGS. 1 and 2, an exhaust system 1 for an internal combustion engine, not shown here, comprises an exhaust line 2, which leads from an engine block of the internal combustion engine to a tail pipe of the exhaust system 1.

The exhaust line 2 contains for this at least one exhaust pipe 3, which has a pipe wall 4. The pipe wall 4 defines on its inner side 5 an exhaust gas path 6 indicated by arrows in FIGS. 1 and 2 for guiding an exhaust gas flow 7, which is likewise indicated by arrows. Within the exhaust line 2, the exhaust pipes 3 connect individual components of the exhaust system 1, which are arranged in the exhaust line 2, with one another. Purely as an example, a particle filter 8, an uncoupling element 9 and an SCR catalytic converter 11 of an SCR system 10 are provided in FIGS. 1 and 2. The particle filter 8 contains a particle filter element 12 and, upstream of the latter, an oxidation catalytic converter element 13. The uncoupling element 9 is used to uncouple the sections of the exhaust line 2 connected thereto in respect to vibrations. The SCR catalytic converter 11 contains an SCR catalytic converter element 14. The SCR system 10 contains, in addition, an injector 15 for introducing a reactant into the exhaust gas flow 7, said injector 15 generating an injected jet 16, which expands in a fan-shaped or conical manner. Further, the SCR system 10 contains in the corresponding exhaust pipe 3 a static mixer 17, which may also act, moreover, as an evaporator for the liquid reactant introduced.

The exhaust system 1 being shown here has, moreover, at least one electric heating device 18, by means of which at least one length section of the exhaust pipe 3 can be heated. In the embodiment shown in FIG. 1, the heating device 18 is arranged in the SCR system 10, i.e., in the area of a reactant feed device 19, which is formed by the SCR system 10 here. The reactant feed device 19 is consequently used in this case to feed a reducing agent as a reactant. In another embodiment, such a reactant feed device 19 may also be arranged, for example, upstream of the particle filter 8 in order to feed fuel to the exhaust gas flow 7, which fuel can be reacted in the oxidation catalytic converter element 13. The reactant feed device 19 is consequently used in this case to feed an oxidizing agent as the reactant.

In the embodiment shown in FIG. 2, the heating device 18 is arranged in the area of an exhaust gas probe 20, which is mounted on the exhaust pipe 3. The exhaust gas probe 20 may be, for example, a lambda probe or an NOX sensor. Even though the two examples of the heating devices 18 are shown alternatively in FIGS. 1 and 2, provisions may be made in another embodiment of the exhaust system for both heating devices to be implemented simultaneously. Embodiments of the arrangement of the heating device 18 are explained in FIGS. 3 through 6. If meaningful, these special embodiments can also be implemented for the arrangement of the heating device 18 shown in FIG. 2.

Corresponding to FIGS. 1 through 6, the respective heating device 18 comprises at least one heating coil 21, which winds several times around the corresponding exhaust pipe 3 on an outer side 22 of the pipe wall 4 in the desired length section of the exhaust pipe 3. Corresponding to FIGS. 3 through 6, the respective heating coil 21 comprises an electric conductor 23, which consists of a resistance heating material. Further, an electric insulator 24 is arranged between the conductor 23 and the outer side 22 of the pipe wall 4. Further, the heating device 18 comprises a heat-insulating cover 25, which envelops the exhaust pipe 3 in the area of the heating coil 21 in question, such that the heating coil 21 in question is fully enclosed by the cover 25. For example, the cover 25 has a shell 26 mounted on the exhaust pipe 3 as well as an electrically insulating filling 27, which fills an annular space 28, which is formed between the shell 26 and the exhaust pipe 4 and in which the respective heating coil 21 is arranged. The shell 26 is preferably made of metal and can be welded to the exhaust pipe 3. The filling 27 may be formed by electrically insulating fiber material, which is fabricated, e.g., as a fiber mat.

Figure 5:
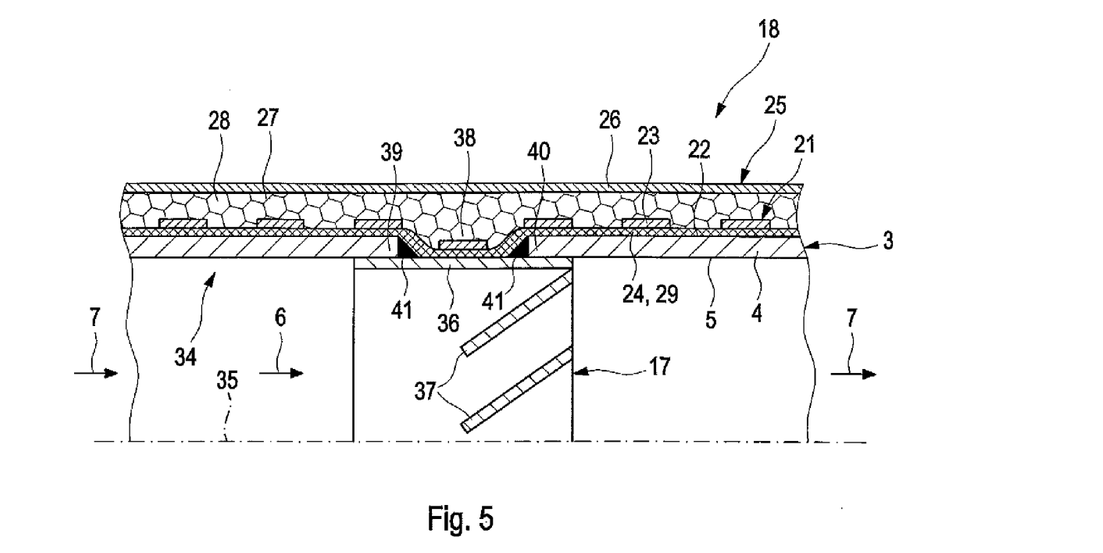
FIG. 5 is a highly simplified half longitudinal sectional view of the exhaust system in the area of the heating device showing one of different embodiments.

In the embodiment shown in FIG. 5, the insulator 24 is formed by an insulating layer 29, which is applied to the outer side 22 of the pipe wall 4. The conductor 23 is wound on the insulating layer 29 and is in contact with same. The heating coil 21 is formed by the conductor 23 only in this case. In the example according to FIG. 5, the conductor 23 has a rectangular cross section, so that the conductor 23 is essentially strip-shaped. The insulating layer 29 may be formed by electrically insulating fiber material, which is fabricated, e.g., as a fiber mat.

Figure 3:
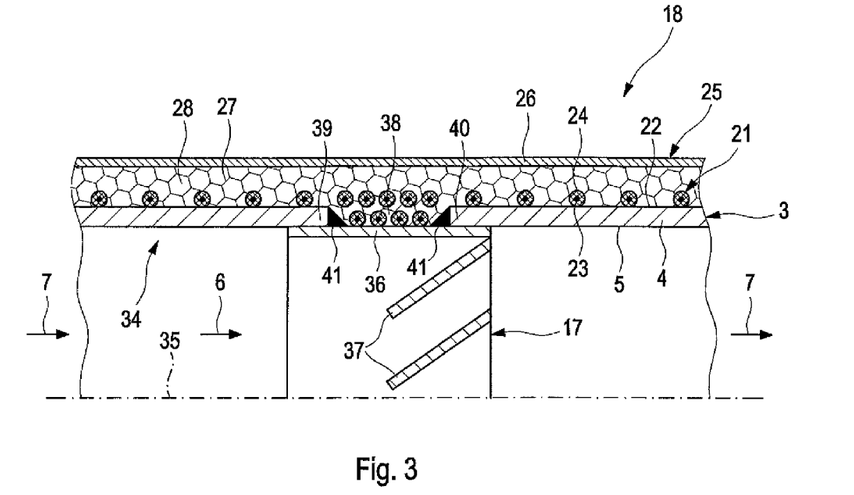
FIG. 3 is a highly simplified half longitudinal sectional view of the exhaust system in the area of the heating device showing one of different embodiments.
Figure 4:
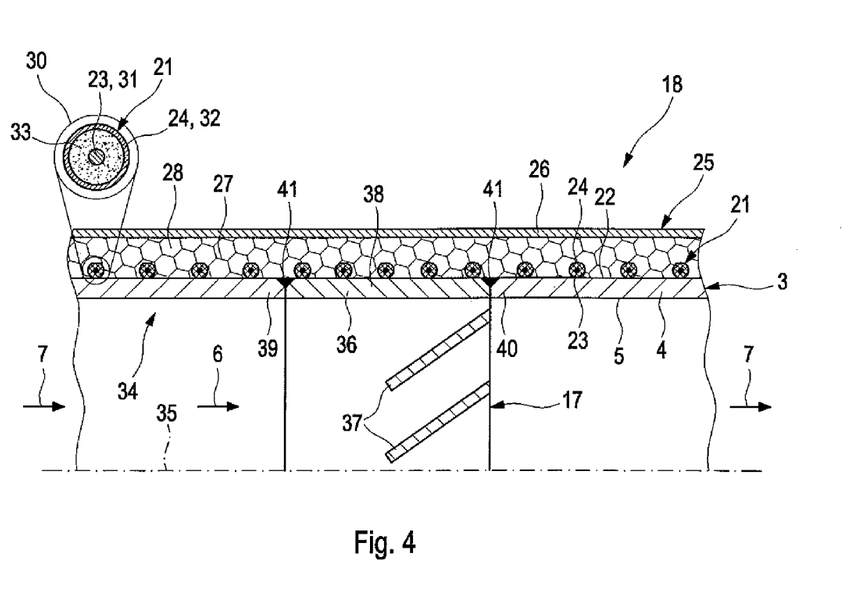
FIG. 4 is a highly simplified half longitudinal sectional view of the exhaust system in the area of the heating device showing one of different embodiments.
Figure 6:
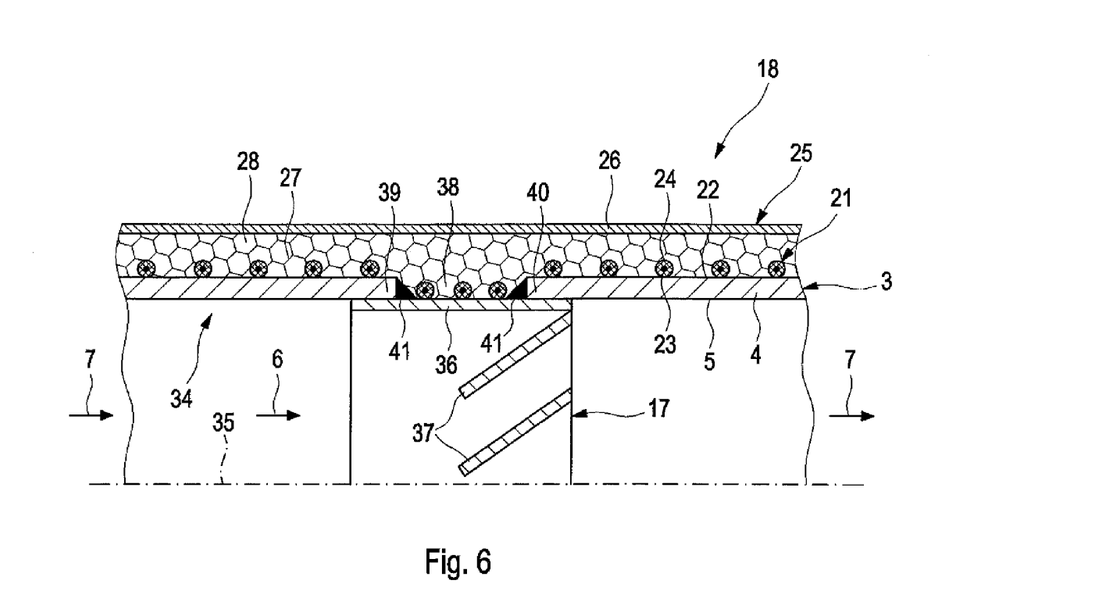
FIG. 6 is a highly simplified half longitudinal sectional view of the exhaust system in the area of the heating device showing one of different embodiments.

The respective heating coil 21 has a different design in the embodiments shown in FIGS. 3, 4 and 6, FIG. 4 showing a cross section of the heating coil 21 in an enlarged detail. The heating coil 21 correspondingly has in these embodiments a core 31, which is enveloped by a jacket 32, and a powder filling 33 may, in addition, be arranged between the jacket 32 and the core 31. The core 31 forms the conductor 23. The jacket 32 forms the insulator 24 at least partially. If the powder filling 33 is present, this is electrically insulating and forms another part of the insulator 24.

According to FIG. 1, the heating device 18 is arranged in the area of the injector 15, as a result of which the risk of permanent deposition of condensate and reactant can be reduced in the area of the injector 15. Further, the heating device 18 is arranged, according to FIG. 1, in the area of a wall section 34, which is located opposite the injector 15 in the spraying direction of the injector 15. The spray jet 16 can thus impact said wall section 34. In case of the coaxial introduction of the reactant indicated in FIGS. 1 and 2 concentrically to a central longitudinal axis 35 of the exhaust pipe 3, which said central longitudinal axis is indicated in FIGS. 3 through 6, said wall section 34 is cylindrical and is located directly upstream of the mixer 17. This wall section 34 is also indicated correspondingly in FIGS. 3 through 6.

As can be seen in FIGS. 1 and 3 through 6, the heating device 18 is arranged, moreover, in the area of the mixer 17, because the mixer 17 also represents a preferred impact surface for the reactant introduced in the liquid form. In the exemplary embodiments being shown here, the mixer 17 has a cylindrical pipe body 36, from which a plurality of guide blades 37 project inwardly, i.e., in the direction of the central longitudinal axis 35. The guide blades 37 are oriented essentially radially here. The exhaust pipe 3 may also be designed, in principle, as an axially continuous exhaust pipe in the area of the mixer 17, in which case the pipe body 36 is in contact with the inner side 5 of the pipe wall 4 as flatly as possible over its entire axial length in order to make possible the most efficient heat transfer possible between the exhaust pipe 3 and the mixer 17. However, the exhaust pipe 3 or its cylindrical pipe wall 4 is provided in the preferred embodiments shown in FIGS. 3 through 6 with an axial interruption 38 in the area of the mixer 17, such that two sections 39, 40 axially adjoining this interruption 38 are located opposite each other with their axial end faces in the interruption 38 and are located at spaced locations from one another in the axial direction. This interruption 38 is bridged over by the pipe body 36 of the mixer 17, preferably such that the pipe body 36 axially overlaps both pipe sections 39, 40. The pipe body 36 is advantageously connected rigidly and tightly to the two pipe sections 39, 40 by means of a weld seam 41 each, which extends fully and in a closed form in the circumferential direction. This axial overlapping of the pipe body 36 with the two pipe sections 39, 40 is provided in the variants according to FIGS. 3, 5 and 6. The pipe body 36 is in contact in this case with the inner side 5 of the respective pipe wall 4. Contrary to this, FIG. 4 shows an embodiment in which the pipe body 36 is inserted into the interruption 38 flush with the pipe sections 39, 40, so that the two pipe sections 39 with their axial end faces are arranged such that they each abut the axial end faces of the pipe body 36. These joints are also connected with one another by means of the weld seams 41.

As can be seen in FIG. 3, the heating coil 21 may have a higher winding density in the area of the pipe body 36, especially in the area of the interruption 38, than outside the interruption 38 or outside the pipe body 36. FIG. 3 shows, purely as an example, a shorter axial distance between adjacent turns of the heating coil 21. Further, the heating coil 21 is designed as a two-layer heating coil in the area of the interruption 38 in the radial direction in the example shown in FIG. 3, as a result of which increased winding density is likewise obtained.

Furthermore, provisions are made in the embodiments shown in FIGS. 3 through 6 for the heating coil 21 to be directly in contact with the pipe body 36 in the area of the interruption 38. The insulating layer 29 is also provided for this purpose in the area of the interruption 38 and is applied to the pipe body 36 there in the embodiment shown in FIG. 5.

According to FIGS. 1 and 2, the heating device 18 may have, moreover, a control device 42, which controls the energization of the heating coil 21. In a simple embodiment, the control device 42 may embody a simple control, which operates by means of time diagrams and/or characteristic diagrams. It is likewise possible that the temperature control of the heating device 18 is carried out by means of at least one PTC element, which is connected in series with the conductor 23 or is formed at least partly by the conductor 23. It is likewise conceivable that the control device 42 regulates the heating device 18, i.e., it carries out the energization of the heating coil 21 in the sense of a regulation. At least one temperature sensor 43, which is connected with the control device 42 in a suitable manner, may be provided for this purpose. The temperature sensor 43 is arranged in the area of the mixer 17 in the example according to FIG. 1. The temperature sensor 43 is arranged in the area of the sensor 20 in the example according to FIG. 21. The control device 42 is advantageously designed or programmed such that it controls or regulates the energization of the respective heating coil 21 such that the relevant areas in the exhaust pipe 3 are heated to above an evaporation temperature. The relevant areas are the areas that are exposed to increased risk of condensation of an evaporated liquid entrained in the exhaust gas flow 7 or to an increased risk of precipitation of a liquid introduced into the exhaust gas flow 7. The evaporation temperature is coordinated with the particular liquid. In the case of FIG. 1, it is the evaporation temperature of the reactant, and the areas in question are essentially the mixer 17 and the guide blades 37 of the mixer 17 and the wall section 34 adjoining same in the upstream direction. The area of the injector 15 is affected as well. The relevant liquid is water and the relevant area is arranged around the sensor 20 in the example according to FIG. 2.

The control device 42 is especially advantageously configured such that it takes into account a current exhaust gas temperature and/or a current reactant temperature and/or a current quantity of injected reactant during the energization of the respective heating coil 21. The control device 42 of the heating device 18 can communicate for this, for example, with a control device 44 of the SCR system 10, which latter control device is used, for example, to actuate the injector 15.

While specific embodiments of the invention have been shown and described in detail to illustrate the application of the principles of the invention, it will be understood that the invention may be embodied otherwise without departing from such principles.

What is claimed is:

1. An exhaust system for an internal combustion engine, the exhaust system comprising:
   an exhaust line comprising an exhaust pipe with a pipe wall having an inner side defining an exhaust gas path for guiding an exhaust gas flow;
   a reactant feed device connected to the exhaust pipe, said reactant feed device comprising an injector for introducing reactant into the exhaust gas flow and a mixer arranged in the exhaust pipe downstream of the injector;
   an electric heating device for heating a length section of the exhaust pipe, the heating device comprising:
   a heating coil, which winds several times around the exhaust pipe on an outer side of the pipe wall, in the length section, the heating coil comprising an electric conductor formed of a resistance heating material;
   a heat-insulating cover, which envelops the exhaust pipe at least in the areas of the heating coil; and
   an electric insulator arranged between the conductor and the outer side of the pipe wall, the heating device being arranged in an area of the mixer and in an area of the reactant feed device, the mixer comprising a cylindrical pipe body and a plurality of guide blades projecting from the cylindrical pipe body, which is in contact with the inner side of the pipe wall, wherein in an area of the mixer, the pipe wall has an axial interruption, which is bridged by the pipe body, wherein at least one of the heating coil is directly in contact with the pipe body in the area of the interruption and the heating coil has a higher winding density in an area of the pipe body than outside the area of the pipe body.

2. An exhaust system in accordance with claim 1, wherein:
   the insulator is comprised of an insulating layer applied to the outer side of the pipe wall; and
   the conductor is wound on the insulating layer and is in contact with same.

3. An exhaust system in accordance with claim 1, wherein:
   the heating coil comprises a core forming the conductor; and
   a jacket forms at least part of the insulator and envelops the core.

4. An exhaust system in accordance with claim 1, further comprising an exhaust gas probe mounted on the exhaust pipe, wherein the heating device is arranged in an area of the exhaust gas probe.

5. An exhaust system in accordance with claim 1, wherein:
   a portion of the heating device is arranged in an area of the injector.

6. An exhaust system in accordance with claim 1 wherein:
   a portion of the heating device is arranged in an area of a wall section of the exhaust pipe, which wall section is located opposite the injector with respect to a spraying direction of the injector.

7. An exhaust system in accordance with claim 1, wherein at least one of:
   the heating device further comprises a control controlling the heating device based on a time diagram and/or characteristic diagram; and
   the heating device further comprises a PTC element, which is connected in series with the conductor or which is formed by the conductor; and
   the heating device further comprises a regulating device with at least one temperature sensor.

8. An exhaust system in accordance with claim 1, wherein the heating device further comprises a control device configured and/or programmed such that the control device carries out an energization of the heating coil.

9. An exhaust system in accordance with claim 1, wherein the cover comprises:

a shell mounted on the exhaust pipe; and
an electrically insulating filling, which fills an annular space between the shell and the exhaust pipe, in which the heating coil is arranged.

10. An exhaust system in accordance with 9, wherein the pipe body is arranged in an interior of the pipe wall.

11. An exhaust system in accordance with 10, wherein the pipe wall has an inner pipe wall surface, the pipe body comprising a first pipe body portion and a second pipe body portion, the first pipe portion engaging a first portion of the inner pipe wall surface and the second pipe body portion engaging a second portion of the inner pipe wall surface.

12. An exhaust system in accordance with 11, wherein the pipe body comprises a third pipe body portion, the third pipe body portion extending between the first portion of the inner pipe wall surface and the second portion of the inner pipe wall surface, wherein the third pipe body portion does not contact the pipe wall.

13. An exhaust system in accordance with 12, wherein the third pipe body portion is in direct contact with one or more of the electrically insulating filling and the electric insulator.

14. An exhaust system for an internal combustion engine, the exhaust system comprising:
an exhaust line comprising an exhaust pipe with a pipe wall having an inner side defining an exhaust gas path for guiding an exhaust gas flow, the pipe wall having a first pipe wall portion and a second pipe wall portion, the first pipe wall portion being located at a spaced location from the second pipe wall portion to define a gap between the first pipe wall portion and the second pipe wall portion, the first pipe wall portion comprising a first pipe wall portion inner surface, the second pipe wall portion comprising a second pipe wall portion inner surface;
a reactant feed device connected to the exhaust pipe, the reactant feed device comprising an injector for introducing reactant into the exhaust gas flow and a mixer arranged in the exhaust pipe downstream of the injector; and
an electric heating device for heating a length section of the exhaust pipe, the heating device comprising:
a heating coil, which winds several times around the exhaust pipe on an outer side of the pipe wall, in the length section, the heating coil comprising an electric conductor formed of a resistance heating material;
a heat-insulating cover, which envelops the exhaust pipe at least in the areas of the heating coil;
an electric insulator arranged between the conductor and the outer side of the pipe wall, said heating device being arranged in an area of the mixer and in an area of the reactant feed device, the mixer comprising a cylindrical pipe body and a plurality of guide blades projecting from the cylindrical pipe body, the gap being located in an area of the mixer, the pipe body bridging the gap, said pipe body being in direct contact with the first pipe wall portion inner surface and the second pipe wall portion inner surface, wherein at least one of the heating coil is directly in contact with the pipe body in the area of the gap and the heating coil has a higher winding density in an area of the pipe body than outside the area of the pipe body.

15. A method for operating an exhaust system for an internal combustion engine, the method comprising the steps of:
providing the exhaust system with an exhaust line comprising an exhaust pipe having a pipe wall with an inner side defining an exhaust gas path for guiding an exhaust gas flow, the exhaust system further comprising an electric heating device for heating a length section of the exhaust pipe, which heating device comprises a heating coil wound several times around the exhaust pipe on an outer side of the pipe wall in the length section, the exhaust system further comprising a reactant feed device connected to the exhaust pipe, the reactant feed device comprising an injector for introducing reactant into the exhaust gas flow and a mixer arranged in the exhaust pipe downstream of the injector, the heating device being arranged in an area of the mixer and in an area of the reactant feed device, the mixer comprising a cylindrical pipe body and a plurality of guide blades projecting from the cylindrical pipe body, which is in contact with the inner side of the pipe wall, wherein in an area of the mixer, said pipe wall has an axial interruption, which is bridged by the pipe body, wherein at least one of the heating coil is directly in contact with the pipe body in the area of the interruption and the heating coil has a higher winding density in an area of the pipe body than outside the area of the pipe body; and
controlling and/or regulating the energization of the heating coil such that at least one area in the exhaust pipe, which area is exposed to the risk of condensation of an evaporated liquid being entrained in the exhaust gas flow or to the risk of precipitation of a liquid introduced into the exhaust gas flow, is heated to above an evaporation temperature of the respective liquid.

16. A method in accordance with claim 15, wherein the pipe body is arranged in an interior of the pipe wall.

17. A method in accordance with claim 15, wherein the pipe wall has an inner pipe wall surface, the pipe body comprising a first pipe body portion and a second pipe body portion, the first pipe portion engaging a first portion of the inner pipe wall surface and the second pipe body portion engaging a second portion of the inner pipe wall surface.

18. A method in accordance with claim 17, wherein the pipe body comprises a third pipe body portion, the third pipe body portion extending between the first portion of the inner pipe wall surface and the second portion of the inner pipe wall surface, wherein the third pipe body portion does not contact the pipe wall.

19. A method in accordance with claim 18, further comprising a heat insulating cover comprising an electrically insulating filling, the third pipe body portion being in direct contact with one or more of the electrically insulating filling and the heating coil.

* * * * *